Jan. 1, 1957 L. T. ELLIOTT ET AL 2,775,906
VALVE OPERATOR

Original Filed July 10, 1950 3 Sheets-Sheet 1

Lynn T. Elliott
Leon Ince
INVENTORS

BY
Browning & Simms

ATTORNEYS

Jan. 1, 1957     L. T. ELLIOTT ET AL     2,775,906
VALVE OPERATOR Original Filed July 10, 1950     3 Sheets-Sheet 2

Lynn T. Elliott
Leon Ince
        INVENTORS BY
*Browning & Simms*
        ATTORNEYS Jan. 1, 1957  L. T. ELLIOTT ET AL  2,775,906
VALVE OPERATOR Original Filed July 10, 1950  3 Sheets-Sheet 3

Fig. 7

Lynn T. Elliott
Leon Ince
INVENTORS

BY
Browning & Simms
ATTORNEYS

2,775,906

VALVE OPERATOR

Lynn T. Elliott and Leon Ince, Houston, Tex.

Continuation of application Serial No. 172,918, July 10, 1950. This application October 11, 1955, Serial No. 539,791

27 Claims. (Cl. 74—625)

This invention relates to improvements in operators for valves and refers more particularly to the clutch and shifting mechanism for selectively engaging either the manual or the power driven turning means with the gear train for turning the rotary drive member of the operator. Still further, our invention provides a reciprocable clutch subassembly which may readily be shifted to declutch a valve control from motor operation position when manual operation is desired. Moreover, we include means whereby initial turning of a handcrank will effect a shifting of the clutch to manual operation position from motor operation position. This application is the continuation of our application for Letters Patent Serial No. 172,918, filed July 10, 1950, for "Valve Operator."

When relatively large valves are employed for controlling flow through large diameter pipe lines, or sizeable process lines and the like, it has become the present day practice to employ a power operator for actuating the valve to accomplish opening and closing thereof. Usually, these actuators have provision for manual operation as well as for power operation. Power operation, for example, may be either by electric motors or by pneumatic motors mounted on the valve operator unit. In order to avoid accidents, it is desirable that the hand turning means in the operator not be in operative engagement with a gear train when it is meshed with the power drive. Obviously, the power means turns a gear train much more rapidly than it may be turned by hand, and if both the manual and the power turning means are operatively connected to a common gear train at the same time, the manual handwheel means might be turned so rapidly as to be dangerous.

It has heretofore been proposed to provide an arrangement wherein the power and manual turning means will never be connected to a common gear train at the same time. However, in one typical earlier device, such as shown in Ball Patent No. 2,114,013, for example, a manual shifting mechanism has been required which calls for a declutch lever extending exteriorly of the operator housing by which a clutch member may be shifted from the power operating position to the manual operating position. Since such clutch member was mounted for engagement with the worm gear, it developed in practice with self-locking worm drives that that clutch member became a part of the stressed power drive gear train which made declutching from motor drive position very difficult and relatively impractical even when stress relief tapers were provided on the clutch teeth. Self-locking gearing and self-locking threaded members are sometimes termed irreversible and refer to toothed and/or threaded cooperating drive and driven members generally having a lead on the drive side such that forces to which the driven member may be subjected do not cause movement of the drive member. Such self-locking mechanism is in contrast to gearing and/or members in threaded engagement which are non-locking in operation.

In addition, many such earlier operators had an elaborate and complicated detent means provided for holding the clutch member in the hand operating position, with a spring to bias the clutch member toward the motor operating position whenever such interlocking detent means were released. Such an arrangement is complicated, inflexible and costly, subject to breakdowns, and requires undue headroom. Further, the declutch lever and the necessity for packing about the shaft which extends through the housing and is connected to the hand operated declutch lever are undesirable.

An object of this invention is to provide in an operator a mechanism for automatically shifting a reciprocable clutch member easily and readily in whichever direction is involved to a position for making a drive connection with the particular turning means which is being actuated, irrespective of the use of self-locking gearing or threaded members in our new valve control.

Another object is to provide in a clutch mechanism of this character an arrangement in which the clutch member is adapted to turn a shaft on which the clutch member is shiftable through a neutral position between two operative positions respectively for engagement with manual and power driving means, whereby but one of said driving means can engage said clutch member at one time to turn said shaft.

A further object is to provide a clutch shifting mechanism for valve operators which is compact and in which the clutch member therein is not normally biased toward either operative position.

Still another object is to provide a clutch mechanism for valve operators in which the clutch member is not biased toward either operative position except that when it is necessary to shift the clutch member from one operative position to the other, such shifting is accomplished automatically in that initial turning of a handcrank or handwheel in the manual drive will shift the clutch member to manual drive position, if not already therein, from motor drive position, and conversely, actuation of the motor drive will shift the clutch member to motor drive position, if not already therein, from manual drive position.

A still further object is to provide a clutch shifting mechanism for valve operators in which the clutch member is shifted automatically in either direction as appropriate by hydraulic means in response to actuation of one of the respective turning means.

Yet another object is to provide such a clutch shifting mechanism in a housing in which there is an oil bath which lubricates the gear trains of the operator is circulated as the hydraulic fluid for the clutch actuating mechanism.

Yet a further object is to provide a valve operator having a manually driven shaft, a motor driven shaft and a clutch shaft in parallel in the clutch and shifting mechanism part thereof and, further, which does not employ any detents or external shifting or declutching levers.

Even another object is to provide a clutch shifting mechanism for a valve operator wherein reciprocating pump means, responsive to actuation of one of the turning means for the operator, is effective to pressurize a plunger for moving the clutch member to an operative position corresponding to the turning means being actuated.

Other and further objects of the invention will appear as the description proceeds.

In the accompanying drawings forming a part of the instant specification and wherein like reference numerals are used in the various views to indicate like parts.

Figures 1, 3:
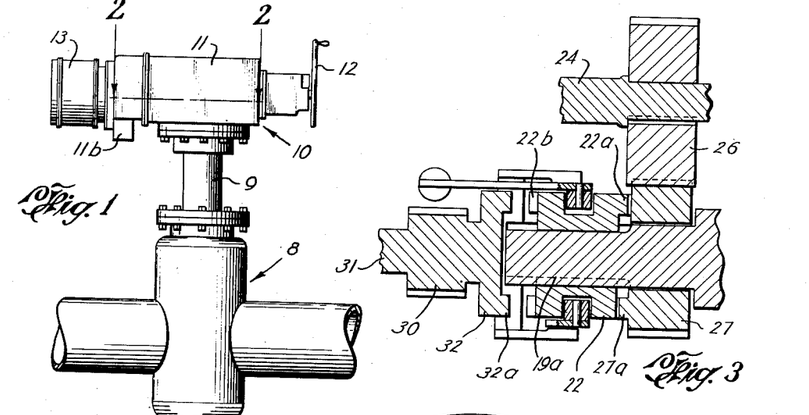
Fig. 1 is a side elevational view illustrating a valve with an operator constituting an embodiment of this invention, mounted thereon.
Fig. 3 is a sectional detail upon an even larger scale, illustrating the clutch means and the two gears which are driven respectively by the manual and power actuated turning means.

By referring to Fig. 1, it will be seen that a valve which may be designated generally at 8, having a yoke 9 secured thereto, is equipped with an operator unit mounted thereon designated generally by the numeral 10. The operator has a housing 11 for suitable gear trains, to be hereinafter more fully described, with a handwheel 12 on a shaft extending exteriorly from one end of the housing and a motor means 13, such as a reversible electric motor, mounted at the other end of the housing. The handwheel and motor means constitute respective drive or turning means which are selectively connectible by the clutch means and gears within the housing 11 to a rotary member or bushing nut which in turn is operatively connected to the stem of a valve to be operated.

Figure 2:
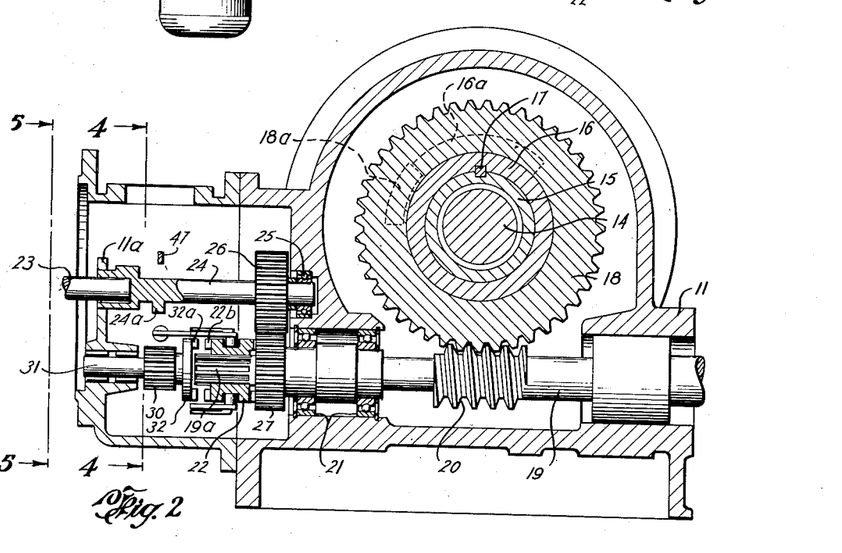
Fig. 2 is a sectional view upon an enlarged scale taken along the line 2—2 in Fig. 1, in the direction of the arrows.

Referring in more detail to the drawings, the valve 8 may be a gate type valve as shown which has a stem 14 shown in Fig. 2, extending through the yoke 9 and into housing 11. This stem 14 may be provided with Acme type threads for engagement by a bushing nut or rotary member 15. This rotary member preferably is removably received within a sleeve 16 and held against relative rotation in the sleeve by a key 17. The sleeve 16 is suitably journaled within housing 11 by bearing means which, in the interest of simplicity, have not been shown because the invention does not relate directly to this portion of the operator. It is believed, however, that journals for this portion of an operator mechanism may be provided as will be well understood by those skilled in the art. On the other hand, for details of a new construction useful as a preferred embodiment of such portion for an operator as illustrated, the copending application for patent for "Valve Operator," executed by James N. Morrell on the 27th day of June, 1950, and filed in the Patent Office on the same day and simultaneously with this application, and identified by Serial No. 172,841 (now Patent 2,724,978), may be referred to. In said copending application, the details of such a new removable bushing, the sleeve and mounting therefor, are fully disclosed.

Sleeve 16 has mounted thereon, and is adapted to be rotated by, a worm gear 18. This worm gear has a depending lug 18a which is adapted to engage a radially extending lug 16a carried by the sleeve so as to impart rotary movement to the sleeve when the worm gear is rotated. However, by reference to Fig. 2, it will be seen that the worm gear may be turned through substantially three-quarters of a quadrant before engaging the lugs 16a and 18a and this provides a hammer blow for jarring a stuck valve member loose as will be appreciated by those skilled in the art.

A worm shaft 19 is journaled in housing 11 and carries a worm 20 meshing with worm gear 18. The ratio between worm 20 and worm wheel 18 will usually be such that this worm drive is self-locking, where brakes are not to be specified, as will be understood by those, having ordinary skill in the art, to whom this invention is disclosed.

The left end of shaft 19, as viewed in Fig. 2, is mounted in ball bearing race assemblies 21 and has an extension 19a which is splined and serves as a clutch shaft in the illustrated embodiment. This splined extension 19a carries a clutch member 22 which is slidable thereon but is non-rotatable relative thereto. Thus, the reciprocable clutch 22 is positioned ahead of the worm members 20—18, which is usually self-locking as the threaded engagement between the threads on valve stem 14 and the stem nut 15—16 will usually also be. Hence, clutch 22, even when in its motor drive position, will be in the gear train between motor 13 and the first of any such self-locking members. As a result, shifting clutch 22 out of motor drive position is easily and readily performable by sliding it along clutch shaft 19a because clutch 22 is not in the usually stressed portion of the gear train extending, in the case of the illustrated embodiment, from valve stem 14 to and including worm 20. Although the stem 14 of valve 8 is a non-rotatable so-called "rising" stem, our new valve control units are also applicable to non-rotatable so-called "non-rising" valve stems and to valves of the plug and butterfly type with rotatable stems.

The clutch member 22 is part of the clutch mechanism provided for selectively establishing a drive connection for the worm shaft 19 with either the manually operated turning means including the handwheel 12, or the power driven turning means including the motor 13. The present invention relates closely to and is inclusive of this portion of the mechanism and the mechanism for shifting the clutch member 22 between its two operative positions whenever a need arises for a shift of clutch 22 from its manual drive position to its motor drive position, or vice versa.

The power driven turning means includes the shaft 23 which has a connection as through a positive flexible coupling with the motor 13 for rotating the shaft. In valve control service, the motor 13 would be actuated each time a power operation of the valve is desired, such actuation often being initiated at a remote control station, the actuation of the motor ceasing when the desired extent of movement of valve stem 14 has taken place. The right-hand end of this shaft 23, as viewed in Fig. 2, has a keyed driving connection with a power shaft 24. The ends of shaft 24 may be respectively journaled in partition 11a of the housing and in ball bearing race assembly 25.

A motor drive gear 26 is rigidly mounted on shaft 24 for rotation therewith and meshes with a motor driven gear 27. The latter gear is rotatable on shaft 19 but carries complementary clutching parts 27a adapted to be engaged by confronting clutching parts 22a of the clutch member 22, when the clutch member is shown in its Figs. 2 and 3 position. It will be appreciated that when the parts 22a and 27a are in engagement, the energization or actuation of motor 13 will rotate power shaft 24 and gear 26 and thereby the rotation of gear 27 will rotate the clutch member 22 which in turn again is splined to shaft 19 to impart rotation thereto. This, of course, will turn the worm 20 and drive worm gear 18 in order to actuate the rotary member 15 and stem 14 of the valve in a positive coupling relation.

Figures 4, 5, 6:
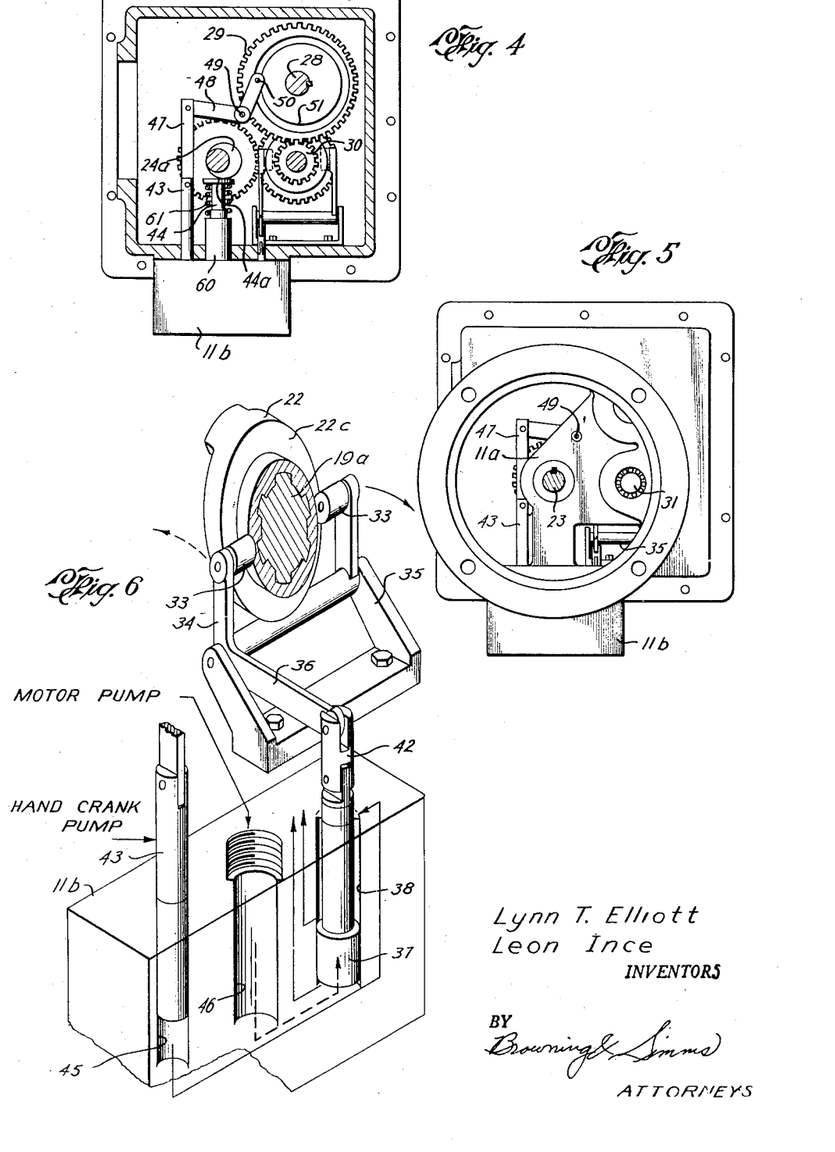
Fig. 4 is a view taken along the line 4—4 in Fig. 2 in the direction of the arrows.
Fig. 5 is a view taken along the line 5—5 in Fig. 2 in the direction of the arrows.
Fig. 6 is an isometric view partly in section illustrating schematically a portion of the clutch, the clutch shifting mechanism and a hydraulic clutch shifting means of the operator shown in the preceding figures.

Referring now to the connection achievable between the handcrank or handwheel 12 and the clutch member 22, reference is made to Figs. 3 and 4 wherein a manual shaft 28 is shown. This is the shaft that carries the handwheel 12 keyed thereto in the illustrated embodiment. Shaft 28 extends from handwheel 12 completely through the main portion of housing 11. In that portion of the housing in which the clutch member 22 resides, there is a manual drive gear wheel 29, keyed to shaft 28, which meshes with a manual driven gear 30. As shown, the manual gears 29 and 30 are spur gears, as are the power gears 26 and 27. Hence, the gear ratio in either of those respective sets of gears may readily be changed where a purchaser or a service might dictate some such change. Indeed, our invention provides a new positive-acting, flexible and compact non-coincidental valve control unit having a compartment in housing 11 for clutch and clutch mechanism with the power shaft 24, the manual shaft 28 and the clutch shaft 19a in adjacent parallel relation therein.

Gear 30 may be mounted upon a stub shaft 31 as shown in Fig. 2. The stub shaft is journaled in roller bearings in housing 11 and gear 30 is keyed thereto for rotation thereon. Gear 30 has an extension 32 with complementary clutching parts 32a adapted to interengage with parts 22b of the clutch member 22 when clutch 22 is in manual drive position. Thus, when the clutch member is shifted from its power drive Fig. 2 position to its opposite extreme position to the left, as viewed in Fig. 2, the interengaging clutching parts 32a and 22b will connect manual shaft 28 through gear 29 to gear 30 and the clutch member 22 for rotation, one with the other in a positive coupling relation. With the clutch member in this latter described manual drive position, it will be manifest that the shaft 19 will be turned by the turning of the handwheel 12 to operate the valve.

Attention is next directed to Fig. 6 in which the mechanism for shifting the clutch member 22 is shown. As previously indicated, the clutch member 22 may be shifted axially upon the splined end 19a of shaft 19 so as to selectively engage either the interengaging parts on gear 27 or those associated with gear 30. The clutch member has a peripheral groove 22c which receives rollers 33 carried by a fork or yoke 34. The fork is pivotally secured to a bracket 35 which may be mounted upon the bottom of the clutch compartment of housing 11 by any suitable means as shown in Fig. 4. The fork also has a crank arm 36, so that upon movement of the arm 36, the yoke 34 will rock and the clutch member 22 will be shifted axially upon the splined portion 19a of the worm shaft 19 in the direction corresponding to such movement. In the illustrated embodiment, an upward movement of the outer end of arm 36 away from the pivot will shift clutch 22 into motor drive engagement position, while a downward movement of such outer end of arm 36 will declutch clutch 22 from motor 13 and move it into its manual drive engagement position.

Thus, this clutch shifting mechanism is such that pivotal movement of lever 36 will move the clutch member 22 into one or the other at one time of its two operative positions for establishing a drive connection respectively between the shaft 19 and gear wheels 27 and 30. Means are also provided for rocking yoke 34 and shifting the clutch member 22 into operative position to establish a drive connection with the one of the gears 27 and 30 which corresponds to the particular turning source being operated. Such means preferably is of the hydraulic type and includes a clutch shift plunger 37 reciprocally mounted in a cylinder 38, the plunger being operatively linked to lever 36. Respective hydraulic pump means are provided for pressurizing opposing areas of the plunger, in response to actuation of the respective manual and power turning means, to thereby shift the plunger and thus effect a change in position of the clutch member 22 whenever clutch 22 is not already in the respective drive position corresponding to the turning means being newly actuated.

Figure 7:
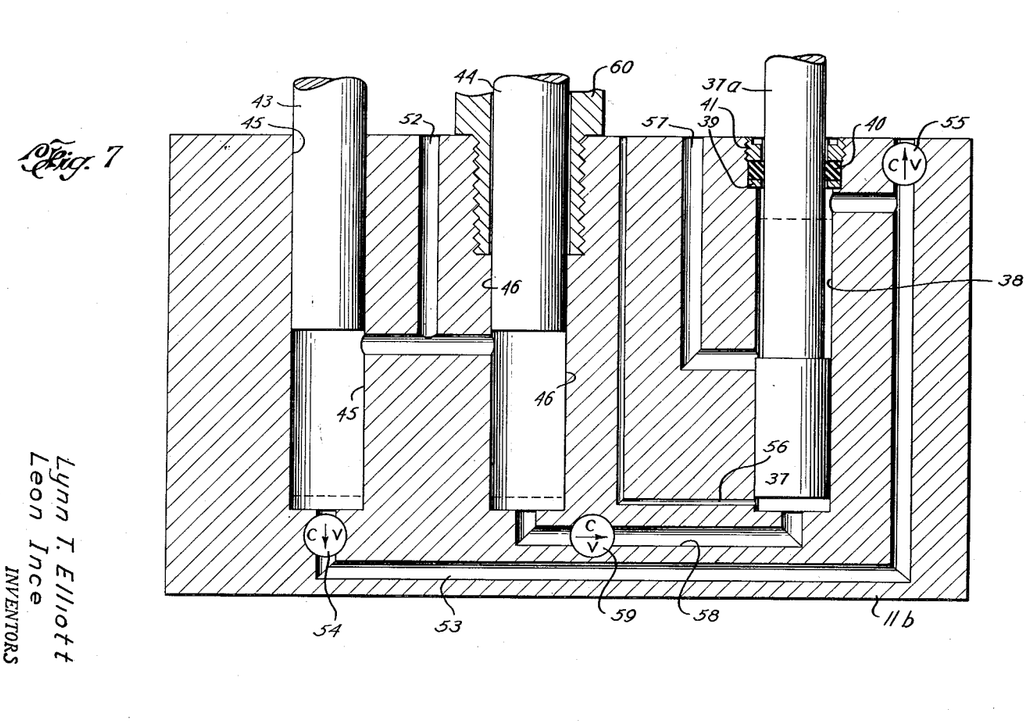
Fig. 7 is a sectional view, showing in an illustrative fashion one form of hydraulic pump means for shifting the clutch member in the operator shown in the preceding views.

Details of such shifting means may be seen by referring to Figs. 4, 6 and 7. A housing block 11b for the pump means and plunger is shown in Fig. 1 as depending from the main housing 11 to which it is affixed. Within this housing block is mounted the plunger 37 adapted to be reciprocally moved in cylinder 38. The mounting includes a seal assembly for the rod stem 37a of the piston plunger 37 as it extends outwardly from the block 11b. Such seal assembly may be made up of a backing washer 39 seated in a counterbore around the top of cylinder 38 and against which a packing element 40 is retained by a gland nut 41.

The plunger 37 is connected by a link 42 to the arm 36 of the yoke. The link 42 is pivoted to the upper end of the plunger rod 37a and to lever 36, so that up or down movement of the plunger 37 will rock the yoke or fork 34 about its pivot on bracket 35 to axially shift the clutch member 22 between its two operative drive positions. The hydraulic pump means for shifting plunger 37 in response to actuation of one of the turning means may include the reciprocable manual pump member 43 and the reciprocable motor pump member 44, mounted loosely so as to be fully slidable in cylinders 45 and 46 respectively.

The pump member 43 has an actuating connection with handwheel 12, as shown in Fig. 4. This connection includes a link 47, pivotally connected to the upper end of pump member 43 and to one arm of a crank member 48. The crank member 48 is mounted on a pivot 49 secured to the web or partition 11a extending upright from the bottom of housing 11. This web and pivot 49 are shown in Fig. 5. The other end of crank 48 has a pin 50 which extends into an eccentric groove 51 formed in the face of manual drive gear 29. Pin 50 may have a roller thereon for reducing wear. It will be recalled that gear 29 is fixed to shaft 28 which carries handwheel 12. Thus, upon rotation of the handwheel, the gear 29 is rotated and due to the eccentric character of the circular groove 51 relative to shaft 28, the crank 48 is rocked about its pivot 49 and thus imparts reciprocal movement to pump member 43 in cylinder 45.

The cylinder 45 communicates, in the illustrated embodiment, at a mid-point through a passage 52 with the interior of the clutch mechanism compartment of housing 11 where hydraulic fluid, preferably the lubricating oil employed to bathe the gears of the operator in the clutch compartment is contained and may be circulated into the bottom portion of the cylinder 45 beneath manual plunger 43. The bottom portion of the cylinder communicates through a passage 53, controlled by a check valve 54, with the upper end of cylinder 38 above plunger 37. This passage 53 also has an extension which communicates with the interior of housing 11 and this extension is controlled by a check valve 55. The check valve 55 is adapted to remain closed normally, while the fluid from manual pump cylinder 45 is being forced through passage 53 into the upper portion of cylinder 38 around rod 37a. However, this check valve is adapted to open when the plunger 37 is forced upwardly by operation of the motor powered pump including power plunger 44. This effect may be accomplished by designing the spring of check valve 55 stronger than that of check valve 54. Thus, the hydraulic liquid within the upper portion of cylinder 38 around rod 37a will exhaust through check valve 55 into the clutch compartment of housing 11 when plunger 37 is forced upwardly. With this arrangement, upon reciprocation of manual pump member 43, due to the turning of handwheel 12, liquid which enters the lower portion of cylinder 45 through passage 52 will be forced out through check valve 54 as plunger 43 descends and through passage 53 into the upper portion of cylinder 38 around rod 37a. If the plunger 37 is in its raised position at that time, this hydraulic pressure fluid from passage 53 will force the plunger 37 downwardly and shift the clutch member 22 into manual drive operating position. In this manual drive position of the clutch, the worm shaft 19 will be turned in response to turning of the handwheel 12 to rotate nut 15—16 and operate valve 8.

It will be noted therefore that our new construction is such that, if the last actuation of a valve operator of our invention had been a motor drive operation which is to be succeeded by a manual drive operation thereof, it would only be necessary for a workman to turn the handcrank or handwheel 12. In so doing, the initial turning of that handwheel would by that act itself automatically declutch the operator from motor drive position and shift clutch 22 into manual drive position in engagement with the clutch jaws 32a whereupon continued turning of handwheel 12 would rotate clutch shaft 22 and worm shaft 19 to manually drive the valve stem 14.

During downward movement of the plunger 37, under the influence of the manually operated pump means connected to the manual turning means, the hydraulic fluid in the lower portion of cylinder 38 is exhausted through a small diameter choke passage 56 in the illustrated embodiment. As there is a building up of pressure above the plunger 37 against its upper face, it is forced into lower position. This passage 56 communicates with the interior of the clutch mechanism compartment of housing 11 so that the liquid discharge enters the main oil bath therein. It is contemplated that this discharge passage, or any other discharge passage operable to circulate fluid in response to either the hand turning means or the motor turning means, could be utilized also if desired to direct fluid under pressure to oil any portion of the new operator mechanism which is not readily oiled by the splash system.

When the plunger 37 reaches its lowermost position, a relatively large diameter discharge port 57 is uncovered. The cross-sectional area of passage 57 is greater than the cross-sectional area of passage 53, so that the pressure differential across member 37 becomes substantially zero as the port 57 is opened. For this reason, when the clutch member 22 has been shifted to its hand operating position by the descent of piston 37, there is no force, resilient or otherwise, which holds or needs to hold it in that manual drive position, the frictional engagement of the interengaging straight-sided jaw parts 22b and 32a connecting clutch 22 to gear 30 being sufficient for that purpose as has been found in actual practice.

It has been found that in operation when the handwheel is turned, with the member 37 in a raised position, the plunger will be moved downwardly somewhat past the position shown in Fig. 7. However, once it reaches this position, it quickly raises to the Fig. 7 position approximately, and the clutch member 22 actually is backed off slightly from the member 32. However, there is still sufficient engagement between the clutch teeth 22b and the teeth or parts 32a to provide a positive drive connection between the clutch 22 and the part 32. This indicates that a floating position is actually reached whereby the forces across plunger 37 tending to move it upwardly and downwardly are in exact balance. This backing off phenomena may be due to the relatively loose fit of plunger 37 in cylinder 38 and the relatively large bottom area of plunger 37 as compared to the annular face area exposed to pressure on the upper side of piston 37 in cylinder 38.

Referring now to the motor operated hydraulic pump means, the lower portion of power pump cylinder 46 is connected by passage 58, in which there is a check valve 59, to the lower end of cylinder 38 beneath plunger 37. Thus, when the motor 13 is operated, power plunger 44, having a relatively loose fit in cylinder 46, forces hydraulic fluid, which enters cylinder 46 beneath plunger 44 through the passage 52, past check valve 59 and through passage 58 into the lower end of cylinder 38 beneath piston 37. This pressure fluid operates against the lower end or face of piston 37 to force it upwardly, if it had been down, and this shifts the clutch member 22 into motor drive position where it establishes driving connection between the worm shaft 19 and the motor 13. When the plunger 37 reaches its uppermost position, port or passage 57 is uncovered whereby the continued operation of piston 44 pumps the hydraulic fluid back into the clutch mechanism compartment through the passages 58 and 57.

It will be appreciated that the new operator is physically non-coincidental since the clutch member 22 must pass through a neutral position so that at no time will operation of the motor 13 tend to impart rotation to the handwheel 12. Likewise, operation of the manual turning means will not have any effect upon the motor turning means.

The pump member 44 has a connection with the motor drive means through an eccentric cam 24a carried by shaft 24, which, it will be recalled, has a drive connection with the motor. This eccentric is shown in Figs. 2 and 4. The member 44 extends through a guide member 60 threaded in the portion 11b of the housing. The member 44 has a bearing plate 44a at its upper end in engagement with eccentric 24a. A spring 61 urges the bearing plate 44a against the eccentric cam 24a so as to return the pump member 44 to its raised position in the course of each revolution of cam 24a.

It is believed that the operation of this device will be apparent from the foregoing description wherein the operation of component parts or elements of the combination was disclosed in connection with the description of these parts or elements. However, a brief description of the over-all operation of an embodiment as illustrated will be included in the interest of a complete disclosure.

It will be assumed that the last time the valve 8 was opened or closed, the motor 13 was employed to accomplish this so that the clutch member 22 is in engagement with the motor driven gear 27. If then it is desired to operate the valve by manual means, the handwheel 12 is turned in the direction to open or close the valve, as it is desired. Initial turning of the handwheel will not affect the valve for the clutch member 22 is not in position to establish drive connection between the hand driven gear 30 and the worm shaft 19. However, initial turning of the handwheel imparts reciprocal movement to the hand operated reciprocal pump member 43 through the connection of this pump member with the eccentric groove 51 of gear 29. The resulting reciprocation of pump member 43 forces the lubricating fluid from housing 11, which enters the pump chamber 45 through passage 52, passes through passage 53 and into the upper portion of cylinder 38 around stem 37a. The plunger 37 is occupying, let us assume, the position at this time indicated by the dotted line across the cylinder 38 in Figure 7. This creates a pressure differential across the plunger, driving it to its lowermost position within cylinder 38 and this, of course, shifts the clutch member 22 out of motor drive position and into position for establishing a drive connection between the hand driven gear 30 and the worm shaft 19 through interengaging clutch parts 32a and 22b.

Continued rotation of the handwheel 12 at a uniform rotational rate will result in a slight backing up of plunger 37 to about the position shown in Fig. 7 in solid lines, but a drive connection is still provided between the hand operated gear 30 and the worm shaft 19. If rotation of the handwheel is speeded up momentarily, plunger 37 will again be forced to its lowermost position, but if this rate of rotation is maintained or slackened, the plunger will then again raise to its Fig. 7 position. It is believed that this clearly indicates that the plunger 37 has reached a floating position whereby the forces tending to move it in either direction, that is upwardly or downwardly, are balanced and the force which holds the clutch in hand operating position appears to be the friction between the interengaging parts 22b and 32a.

When the clutch 22 has been shifted to such hand operating position, continued rotation of the handwheel 12 will effect operation of the valve, moving it to its open or closed position as the case may be.

Then, if the motor driven turning means should be turned on by the energization or actuation of motor 13, the first action thereof causes the shifting of the clutch 22 from hand operating position into position where it establishes a drive connection between motor driven gear 27 and the worm shaft 19 through interengaging clutch parts 27a and 22a. This is accomplished by the hydraulic fluid pumped by member 44 into the bottom of chamber 38 through passage 58 to force the plunger 37 to its raised position, as indicated by the dotted line in Fig. 7. This rocks yoke 34 and shifts the clutch member 22 into motor driven position so that further turning of the motor 13 will effect operation of the valve.

Should the motor 13 be energized or actuated while handwheel 12 is being turned in the illustrated embodiment, that embodiment would exhibit so-called "motor preference." That is to say, the force exerted by the motor pump plunger 44 against the bottom face of piston 37 would force piston 37 to rise regardless of the continuance of movement of manual pump plunger 43 due to the continuance of the turning of the handwheel 12. In rising, piston 37 would shift clutch 22 from manual drive position into motor drive position for a motor drive operation of the new valve operator and the valve controlled thereby. As will be readily understood by those skilled in the art to whom this invention is disclosed, devices made in accordance with our invention may be readily constructed to exhibit so-called "manual preference" instead, as by sufficiently increasing the diameter of the manual pump plunger 43 relative to the diameter of the motor pump plunger 44, or by transposing the respective places at which the passages 53 and 58 discharge into the clutch piston cylinder 38, or by other rearrangement.

In the interest of simplicity, the invention has been described without showing any limit switches or torque switch means for turning off the motor 13 when the valve member of the valve 8 has reached seated or extreme position upon being either raised or lowered. However, it is contemplated that a switching arrangement may be made to effect this disconnection of the motor 13 from its source of power, when the valve has been completely opened or closed, in any manner which is conventional to the art as will be well understood by those skilled in the art.

It will be apparent that various ends and objects of this invention have been accomplished. There has been provided an operator for a valve which is a unit, readily attachable to and removable from such valve, and which may be driven either manually or by power means but in which the gear train for operating the valve will never be in connection with both turning means. The arrangement is such that the structure is very simple and no external clutch shifting levers are required. The construction is such that the shifting is accomplished automatically in response to actuation of either turning means, and no complicated detent mechanism is required for holding the clutch in either operative position and the clutch is not biased by any spring or other resilient means toward either operative position. The operator and the clutch shifting mechanism particularly, are compact, positive in action, simple, rugged, of utility and yet readily lend themselves to manufacture and assembly.

From the foregoing it will be seen that this invention is one well adapted to attain all of the ends and objects hereinabove set forth together with other advantages which are obvious and which are inherent to the structure. For example, even though the worm members 18 and 20, and/or the stem and nut members 14 and 15, are made self-locking in keeping with common practice, the clutching subcombination herein is unique because clutch 22 is not bound in in the stressed portion of the gear train even after a motor drive operation with the result that the mere turning of the handwheel 12 will not only automatically declutch clutch 22 from motor drive engagement position, but such declutching will take place easily by the sliding of clutch 22 on clutch shaft 19a until it is in manual drive engagement with complementary clutching parts 32a. Thus, the reciprocable clutch means in our invention is on the "high-speed" side of all such self-locking members and therefore not subject to the ills of prior clutches and valve operators where such was not the case.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

We claim:

1. In a valve control unit adapted to be mounted on a valve to operate it, in combination, a handcrank mounted on the unit, a motor mounted on the unit, a manually operable clutching member within the unit connected to said handcrank and adapted to be turned when said handcrank is turned, a motor operable clutching member within the unit connected to said motor and adapted to be turned when said motor is turned during actuation thereof, a reciprocable clutch member adapted to be in operative engagement with but one of said respective clutching members at one time, means operable by the turning of said handcrank to urge said clutch member toward clutching engagement with said manually operable clutching member, and means automatically responsive to the turning of said motor to urge said clutch member toward clutching engagement with said motor operable clutching member.

2. Mechanism as set forth in claim 1, in which, a pressure responsive member is connected to said clutch member, and hydraulic pressure-exerting members are respectively included in said first-named and second-named means to exert a force upon said pressure responsive member in a direction corresponding to whichever of the clutching members is being operated at the time being.

3. In a non-coincidental valve control, in combination, a handcrank shaft having a manual drive gear thereon, a motor operated shaft having a motor drive gear thereon, a clutch member shaft, a reciprocable clutch member slidably but not rotatably mounted on said clutch shaft, a manually driven gear rotatably mounted adjacent said clutch member, said manually driven gear being in engagement with said manual drive gear and being connected to a manual clutching part for clutching engagement with said clutch member when said clutch member is in manual drive position, a motor driven gear rotatably mounted adjacent said clutch member, said motor driven gear being in engagement with said motor drive gear and being connected to a power clutching part for clutching engagement with said clutch member when said clutch member is in motor drive position, said respective clutching parts being spaced apart a distance greater than the length of said clutch member so that only one of said respective clutching parts can be engaged by said clutch member at one time, a rockable yoke engaging said clutch member to shift it, pressure means responsive to initial manual turning of said manually driven shaft to rock said yoke to shift said clutch member to manual drive position when such manual turning begins, and pressure means effective upon initial turning of said motor operated shaft to rock said yoke in the opposite direction to shift said clutch member to motor drive position when said motor begins to turn.

4. Mechanism as set forth in claim 3, in which, a reciprocable clutch piston is pivotally connected to said yoke, and a hydraulic pump is included in said first-named pressure means to supply hydraulic liquid to move said piston when said handcrank is turned to shift said clutch member to manual drive position in the event that said clutch member is not already in that position.

5. Mechanism as set forth in claim 4, in which, a hydraulic pump is included in said second-named pressure means to supply hydraulic liquid to move said clutch piston upon actuation of said motor to shift said clutch member to motor drive position in the event that said clutch member is not already in that position, and means for utilizing a lubricating oil supply for the clutch means of said control as a supply of hydraulic liquid for said pumps.

6. In a non-coincidental valve control adapted to move a valve stem, in combination, a manually driven shaft having a manual drive gear thereon, a motor operated shaft having a motor drive gear thereon, a clutch shaft, a reciprocable double-ended clutch member slidably but not rotatably mounted on said clutch shaft, a manually driven gear rotatably mounted in coaxial relation to such clutch shaft, said manually driven gear being in engagement with said manual drive gear and being connected to a manual clutching part for clutching engagement with said clutch member when said clutch member is in manual drive operation position, a motor driven gear rotatably mounted in coaxial relation to such clutch shaft, said motor driven gear being in engagement with said motor drive gear and being connected to a power clutching part for clutching engagement with said clutch member when said clutch member is in motor drive operation position, said respective clutching parts being spaced apart a distance greater than the length of said clutch member, a movable yoke connected to said clutch member to shift it, and means responsive to initial manual turning of said manually driven shaft to exert pressure to move said yoke to shift said clutch member to manual drive operation position when such manual turning begins.

7. In a non-coincidental valve control, in combination, a handcrank, a hand driven gear connected to said handcrank in a positive manner, a motor, a motor driven gear connected to said motor in a positive manner, a clutch shaft, a reciprocable double-ended clutch member slidably but not rotatably mounted on and relative to said clutch shaft, said hand driven gear adapted to be connected to said clutch member when said clutch member is in manual drive position, said motor driven gear adapted to be connected to said clutch member when said clutch member is in motor drive position, said respective driven gears being spaced apart a distance greater than the length of said clutch member, and means responsive to turning of said handcrank to shift said clutch member from any motor drive position thereof to manual drive position when such turning occurs.

8. Mechanism as set forth in claim 7, in which, said means comprises an eccentric member, a hydraulic pump operated by said eccentric member when said handcrank is turned, and a pressure responsive member is connected to said clutch member to receive fluid delivered by said pump to press said clutch member toward engagement in its manual drive position.

9. In a valve operator adapted to be mounted on a valve to operate it, in combination, a motor mounted on the operator, a handcrank mounted on the operator, a clutch compartment, a manually operable shaft adapted to be rotated when said handcrank is turned, a power operable shaft adapted to be turned while said motor is actuated, manual clutching parts adapted to be turned by said manually operable shaft, power clutching parts adapted to be turned by said power operable shaft, said clutching parts being in said clutch compartment, a clutch shaft in said clutch compartment, a clutch member mounted on said clutch shaft, said clutch member being slidably but not substantially rotatable relative to said clutch shaft, said clutch shaft adapted to be driven through said clutch member, first means for shifting said clutch member from motor drive position into manual drive position with said clutch member in engagement with said manual clutching parts automatically upon initial turning of said handcrank, and second means for shifting said clutch member from manual drive position into motor drive position with said clutch member in engagement with said power clutching parts automatically upon actuation of said motor.

10. In a non-coincidental valve operator adapted to be mounted on a valve to move the stem of that valve, in combination, a handcrank, a manual clutching part connected to said handcrank, a motor, a power clutching part connected to said motor in non-locking coupling relation, a clutch shaft, a reciprocable clutch member mounted on said clutch shaft, said clutch member being axially but not substantially rotatably movable relative to said clutch shaft and adapted to drive said clutch shaft, means for moving said clutch member into engagement with said manual clutching part to place said valve operator in manual drive operation condition, gearing of the self-locking type connected to said clutch shaft and adapted to be driven by said clutch shaft, said gearing being connected to said stem, said clutch member being in the train of mechanism between said motor and said self-locking gearing, and means for moving said clutch members into engagement with said power clutching part to place said valve operator in motor drive operation condition, whereby said first-mentioned means is readily operable since said clutch member is not in the stressed portion of the connections between said motor and said stem following a motor drive operation of said valve operator.

11. In a non-coincidental valve operator unit adapted to be mounted on a valve to operate a rotatable member to move the stem of that valve, in combination, a handcrank on said unit, a manual clutching part connected to said handcrank in positive non-locking coupling relation, a motor mounted as a part of said unit, a power clutching part connected to said motor in positive non-locking coupling relation, a clutch shaft, a reciprocable double-ended clutch member mounted on said clutch shaft, said clutch member being axially but not substantially rotatably movable relative to said clutch shaft and adapted to drive said clutch shaft, said clutching parts being spaced apart a distance greater than the length of said clutch member, first means for moving said clutch member into engagement with said manual clutching part to place said unit in manual drive operation condition, gearing of the self-locking type connected to said clutch shaft and adapted to be driven by said clutch shaft, said gearing being connected to said member, said rotatable clutch member being between said self-locking gearing and said respective clutching parts, and second means to move said clutch member into engagement with said power clutching part to place said unit in motor drive operation condition.

12. In a non-coincidental valve operator unit adapted to be mounted on a valve to move the stem of that valve, in combination, a handcrank in said unit, a manual clutching part connected to said handcrank, a motor in said unit, a power clutching part connected to said motor in nonlocking coupling relation, a clutch shaft, a reciprocable clutch member mounted on said clutch shaft, said clutch member being axially but not substantially rotatably movable relative to said clutch shaft and adapted to drive said clutch shaft, means for shifting said clutch member into engagement with said manual clutching part to place said valve operator in manual drive operation condition, said first-named means being actuated by initial turning of said handcrank, gearing of the self-locking type connected to said clutch shaft and adapted to be driven by said clutch shaft, said gearing being connected to said member, said clutch member being in the train of mechanism between said motor and said self-locking gearing, and means for shifting said clutch member into engagement with said power clutching part to place said valve operator in motor drive operation condition, said second-named means being effected upon actuation of said motor.

13. Mechanism as set forth in claim 12, in which, a plunger is pivotally connected to said clutch member, hydraulic pump members are in said first-named and second-named means, and hydraulic fluid passages extend between said respective pump members and opposite sides of said plunger to shift said clutch member one way or the other into clutching engagement corresponding to the manual or power means being actuated.

14. In a non-coincidental valve control adapted to move a valve stem, in combination, a handcrank, a hand driven gear connected to said handcrank, a motor, a motor driven gear connected to said motor, a clutch shaft, a reciprocable clutch member slidably but not rotatably mounted on said clutch shaft, said hand driven gear adapted to be connected to said clutch member when said clutch member is in manual drive position, said motor driven gear adapted to be connected to said clutch member when said clutch member is in motor drive position, pressure exerting means responsive to initial turning of said handcrank to declutch said clutch member and shift it to manual drive position in one direction along said clutch shaft when such handcrank turning begins, pressure exerting means effective upon initial actuation of said motor to shift said clutch member to motor drive position in the opposite direction along said clutch shaft when such motor actuation begins, gearing of the self-locking type connected to said clutch shaft and adapted to be turned when said clutch shaft is turned by said clutch member, said clutch member being between all such self-locking gearing and said respective driven gears, whereby initial turning of said handcrank aforesaid will readily declutch said clutch from its motor drive position.

15. In a valve operator adapted to be mounted on a valve to operate a rotary member to move the stem of that valve, in combination, a housing for the operator having a clutch compartment and a gear compartment, a driven gear in said gear compartment to which said rotary member is adapted to be connected, a clutch shaft in said clutch compartment, a reciprocable clutch member axially but not rotatably movable relative to said clutch shaft adapted to drive said clutch shaft, a drive gear in said gear compartment in engagement with said driven gear, said drive gear being connected to said clutch shaft so as to be driven by said clutch shaft, a motor operated shaft in said clutch compartment, a motor mounted on said operator and adapted to drive said motor operated shaft, a manually operated shaft in said clutch compartment extending parallel to said clutch shaft and said motor operated shaft, a handwheel mounted on said operator to turn said manually operated shaft when said handwheel is turned, and clutching parts respectively rotatable by said manually operated shaft and said motor operated shaft, said clutching parts adapted to be engaged selectively by said clutch member to effect a non-coincidental operation of said operator, whereby a compact, trouble-free valve control unit is provided.

16. In a valve operator adapted to be mounted on a valve to move the stem of that valve, in combination, a housing for the operator having a clutch compartment and a gear generally side-by-side, a ringlike driven gear in said gear compartment, a clutch shaft in said clutch compartment, a reciprocable clutch member on said clutch shaft and axially but not rotatably movable relative to said clutch shaft, said clutch member being adapted to drive said clutch shaft, a drive gear shaft having a self-locking type drive gear thereon in engagement with said driven gear, said drive gear shaft being in said gear compartment and connected to said clutch shaft so as to be rotated by said clutch shaft, a motor operated shaft in said clutch compartment, said motor operated shaft being parallel to said clutch shaft, a motor mounted on a side of said clutch compartment and adapted to drive said motor operated shaft when said motor is actuated and to cease when said motor is deactuated, a manually operated shaft in said clutch compartment extending parallel to said clutch shaft and said motor operated shaft, a handwheel mounted on a side of said gear compartment and having a shaft extending therethrough to turn said manually operated shaft when said handwheel is turned, manual and power clutching parts respectively rotatable by said manually operated shaft and said motor operated shaft through non-locking type connections, said clutching parts adapted to be engaged selectively by said clutch member to effect a non-coincidental operation of said operator, whereby a compact trouble-free clutch operation valve control unit is provided.

17. In a non-coincidental valve control unit to move the valve stem of the valve on which said unit is adapted to be mounted by rotation of a member through gearing to move the stem of said valve, in combination, a unit housing, a handcrank mounted on the housing, a manually operable shaft within said housing, said manually operable shaft having a positive connection with said handcrank, a motor mounted on the housing, a motor operable shaft within said housing having a positive connection with the shaft of said motor, a manual drive gear keyed to said manually operable shaft, a manually driven gear in engagement with said manual drive gear, a positive manual clutching part rigidly connected to said manual driven gear, a motor drive gear of the non-locking type keyed to said motor operable shaft, a motor driven gear in engagement with said motor drive gear, a positive motor clutching part rigidly connected to said motor driven gear, the axis of rotation of said respective clutching parts coinciding, a clutch shaft in said housing extending substantially between said respective clutching parts and having its axis coinciding with the axes of said respective clutching parts, a double-ended reciprocable clutch member mounted on said clutch shaft in slidable but not in any substantial rotatable relation thereto, said clutching parts being free to rotate relative to said clutch shaft when out of engagement with said clutch member, the respective ends of said clutch member having complementary positive clutching members for respective engagement with said respective clutching parts, the length of said clutch member being less than the distance between said respective clutching parts, a self-locking worm drive adapted to be positioned in said housing, a worm shaft in positive connection with said clutch shaft and adapted to be driven by said clutch shaft, pressure means directly operable upon turning of said handcrank to shift said clutch member into manual drive position for engagement with said manual clutching part in the absence of said clutch member from said manual drive position, and pressure means directly operable upon rotation of said motor shaft to shift said clutch member into motor drive position for engagement with said motor clutching part in the absence of said clutch member from said motor drive position.

18. Mechanism as set forth in claim 17, having a rockable yoke pivotally connected to said clutch member to shift it, a reciprocable clutch plunger pivotally connected to said yoke, a reciprocable manual hydraulic pump plunger, eccentric means operable upon turning of said manually operable shaft to reciprocate said manual hydraulic pump plunger to force hydraulic liquid against one side of said clutch plunger to shift said clutch member into manual drive position engagement, a reciprocable hydraulic motor pump plunger, eccentric means operable upon turning of said motor operable shaft to reciprocate said motor hydraulic pump plunger to force hydraulic fluid against the other side of said clutch plunger to shift said clutch member into motor drive position engagement, said respective plungers being reciprocable in cylinders in the housing of said unit.

19. Valve actuating mechanism for a valve having a valve stem, a worm wheel whose rotation effects opening and closing movement of the valve stem, a worm on a shaft for rotating the worm wheel, motor means for power driving the worm including a shaft, handwheel means for manually driving the worm including a shaft, reciprocable clutch means for sequentially drivingly connecting said first-named shaft with either the motor means or the handwheel means, pressure means activated by initial rotation of the handwheel to urge the clutch means into driving connection with the handwheel shaft, and secondary pressure means activated by rotation of the motor means to urge the clutch means into driving connection with the motor shaft.

20. Valve actuating mechanism according to claim 19, wherein means projecting from the motor means shaft activate one of the pressure means.

21. Valve actuating mechanism according to claim 19, wherein cam means on one of the shafts activate one of the pressure means.

22. Valve actuating mechanism according to claim 19, wherein reciprocable means associated with one of the shafts activate one of the pressure means.

23. Valve actuatable mechanism for a valve having a valve stem, a worm wheel whose rotation effects opening and closing movement of the valve stem, a worm on a shaft for rotating the worm wheel, motor means for power driving the worm, handwheel means for manually driving the worm, clutch means for sequentially drivingly connecting said shaft with either the motor means or the handwheel means including a clutch member reciprocable upon said shaft, a first and second gear, the clutch member being between said gears and selectively connectible with each gear, means to urge said clutch member into selective operative connection with one of said gears, a motor driven gear meshing with the first gear, and a handwheel driven gear meshing with the second gear, and means effective between the motor means and the handwheel means for rotating said shaft either by power or manually respectively and selectively through said motor driven gear and said handwheel driven gear, means for moving said last-mentioned means including a yoke to move said clutch member into operative connection with said second gear when said worm is to be manually driven and a cam element for moving said clutch member out of operative connection with said second gear and into operative connection with said first gear for power driving of said worm, said cam element being automatically effective upon the energization of said motor.

24. Valve actuating mechanism comprising a worm wheel for actuating the valve, a worm on a shaft for rotating the worm wheel, a motor for power driving said shaft, a handwheel for manually driving said shaft, clutch means movably carried by said shaft for drivingly connecting said shaft with the motor or handwheel, a clutch operator for operating said clutch means, a member carried by the handwheel, means to move said clutch operator actuatable by said member upon the turning of said handwheel to move said clutch means to connect the handwheel to said shaft upon initial movement of the handwheel so that upon continued movement of the handwheel the valve is actuated, and means operated by the initial movement of the motor to move said clutch means to disconnect said handwheel from said shaft and connect said motor to said shaft.

25. In a valve control including, a valve stem, a motor drive, a worm gear whose rotation effects opening and closing movement of the valve stem, a shaft carrying a worm coacting with the worm gear, a train of power-transmitting elements between the motor drive and the gear having as one of its elements a clutch including a drive element and a reciprocable driven element respectively rotatably and nonrotatably carried by said first-named shaft, a hand motivatable mechanism including a shaft parallel to said first-named shaft carrying a handwheel and a gear, means slidably mounted on said first-named shaft for rotation therewith and for reciprocation with the reciprocable clutch element, means to urge said first-named means and the reciprocable clutch element to a motor drive clutching position longitudinally displaced from the gear on the handwheel shaft, rockable yoke means manually operable to disconnect the motor drive connection with said first-named shaft and to effect axial movement of said first-named means thereon into operative connection with the gear on the handwheel shaft for hand operation of the valve stem.

26. In a valve control including, a valve stem, a motor drive, a worm gear whose rotation effects opening and closing movement of the valve stem, a shaft carrying a worm coacting with the worm gear, a train of power-transmitting elements between the motor drive and the worm gear having as one of its elements a clutch including a driving element and a reciprocable driven element respectively rotatably and nonrotatably carried by said first-named shaft, a hand operable mechanism including a shaft carrying a handwheel and a gear, a toothed member slidably mounted on said first-named shaft for rotation therewith and for reciprocation with the reciprocable element of the clutch, means for urging said toothed member and the reciprocable element of the clutch to a clutching position longitudinally displaced from the gear on the handwheel shaft, a clutch-shifting yoke rockably mounted on a pivot axis transversely of the axis of said first-named shaft and engageable with the reciprocable element of the clutch for effecting axial shifting of that element and the toothed member on said first-named shaft from a first position wherein the motor drive is interconnected with said first-named shaft to a second position wherein the reciprocable clutch element is disengaged from the driving clutch element and the toothed member is operatively connected to the gear of the handwheel shaft for hand operation of the valve stem.

27. In a valve control including a motor drive, a worm wheel whose rotation effects opening and closing movement of a valve stem, a shaft carrying a worm coacting with the worm wheel to rotate said worm wheel, a train of power-transmitting elements between the motor drive and the worm having as one of its elements clutch means including a driving element and a reciprocable clutch element respectively rotatably and nonrotatably carried by said shaft, a hand motivatable mechanism including a shaft parallel to said first-named shaft carrying a handwheel and a gear, a toothed member slidably mounted on said first-named shaft for rotation therewith and for reciprocation with the reciprocable clutch element, means to urge the toothed member and reciprocable clutch element to a declutching position with the toothed member in operative connection with the gear on the handwheel shaft for hand operation of the valve, a clutch-shifting yoke rockably mounted on a pivot axis transversely of the axis of said first-named shaft and engageable with the reciprocable element of the clutch for effecting axial shifting of that element and the toothed member of said first-named shaft for a first position wherein the valve is hand operated to a second position wherein the toothed member is disconnected from the gear of the handwheel shaft and the reciprocable clutch element is engaged with said driving clutch element for motor drive of the valve, and automatic means for effecting rocking of the clutch-shifting yoke and operable upon actuation of the motor drive to disconnect the valve from hand operation.

References Cited in the file of this patent
UNITED STATES PATENTS

| 2,096,251 | Knight et al. | Oct. 19, 1937 |
| 2,414,032 | Fawkes | Jan. 7, 1947 |

FOREIGN PATENTS

| 897,852 | France | June 12, 1946 |